(12) United States Patent
Vlasic et al.

(10) Patent No.: US 7,194,125 B2
(45) Date of Patent: Mar. 20, 2007

(54) SYSTEM AND METHOD FOR INTERACTIVELY RENDERING OBJECTS WITH SURFACE LIGHT FIELDS AND VIEW-DEPENDENT OPACITY

(75) Inventors: Daniel Vlasic, Providence, RI (US); Hanspeter Pfister, Arlington, MA (US); Wojciech Matusik, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 712 days.

(21) Appl. No.: 10/318,708

(22) Filed: Dec. 13, 2002

(65) Prior Publication Data

US 2004/0114794 A1 Jun. 17, 2004

(51) Int. Cl.
G06K 9/00 (2006.01)
G06T 17/00 (2006.01)
(52) U.S. Cl. .................... 382/154; 345/420
(58) Field of Classification Search .......... 382/154
See application file for complete search history.

(56) References Cited

U.S. PATENT DOCUMENTS

| | | | | |
|---|---|---|---|---|
| 6,081,273 | A * | 6/2000 | Weng et al. ............. | 345/420 |
| 6,275,253 | B1 * | 8/2001 | Melen ..................... | 348/43 |
| 6,300,952 | B1 * | 10/2001 | Sidwell et al. .......... | 345/419 |
| 6,496,185 | B1 * | 12/2002 | Keam ...................... | 345/419 |
| 6,654,507 | B2 * | 11/2003 | Luo ......................... | 382/282 |
| 2003/0034988 | A1 * | 2/2003 | Raskar .................... | 345/629 |

OTHER PUBLICATIONS

Kari Pulli, Michael Cohen, Tom Duchamp, Hugues Hoppe, Linda Shapiro, and ☐☐Werner Stuetzle. View-based rendering: Visualizing real objects from scanned ☐☐range and color data. Eurographics Rendering Workshop 1997, pp. 23-34. ☐☐*
McMillan et al., "Plenoptic modeling: An image-based rendering system," Computer Graphics, SIGGRAPH 95 Proceedings, pp. 39-46. 1995.
Chen et al., "View interpolation for image synthesis," Computer Graphics, SIGGRAPH 93 Proceedings, pp. 279-288, 1993.
Levoy et al., "Light field rendering," Computer Graphics, SIGGRAPH 96 Proceedings, pp. 31-42, 1996.
Gortler et al., "The lumigraph," Computer Graphics, SIGGRAPH 96 Proceedings, pp. 43-54, 1996.
Debevec et al., "Modeling and rendering architecture from photographs: A hybrid geometry- and image-based approach," Computer Graphics, SIGGRAPH 96 Proceedings, pp. 11-20, 1996.

(Continued)

*Primary Examiner*—Joseph Mancuso
*Assistant Examiner*—Hadi Akhavannik
(74) *Attorney, Agent, or Firm*—Dirk Brinkman; Clifford D. Muellar; Gene V. Vinokur

(57) ABSTRACT

A method renders a model of a 3D object. A polygon model of the 3D object is generated, and a set of input images are acquired of the object. For each vertex of the polygon model, a set of visible views are located, and a set of closest views are selected from the visibility views. Blending weights are determined for each closest view. Then, the each polygon in the model is rendered into an output image. The rendering is performed by blending images of the set of input images corresponding to the set of closest views of each vertex of the polygon using the blending weights.

18 Claims, 5 Drawing Sheets

OTHER PUBLICATIONS

Pulli et al., "View-based rendering: Visualizing real objects from scanned range and color data," Eurographics Rendering Workshop 1997, pp. 23-34, 1997.

Debevec et al., "Efficient view-dependent image-based rendering with projective texture-mapping," Proceedings of the 9th Eurographics Workshop on Rendering, pp. 105-116, 1998.

Wood et al., "Surface light fields for 3d photography," Computer Graphics, SIGGRAPH 2000 Proceedings, pp. 287-296, 2000.

Nishino et al., "Eigen-texture method: Appearance compression based on 3D model," Proc. of Computer Vision and Pattern Recognition, pp. 618-624, 1999.

Buehler et al., "Unstructured lumigraph rendering," Computer Graphics, SIGGRAPH 2001 Proceedings, pp. 425-432, 2001.

Chen et al., "Light Field Mapping: Efficient Representation and Hardware Rendering of Surface Light Fields," ACM Transactions on Graphics 21, Proceedings of ACM SIGGRAPH 2002, ISSN 0730-0301, pp. 447-456. 2002.

Matusik at al., "Image-based 3D photography using opacity hulls," ACM Transaction on Graphics 21, 3 pp. 427-437, ISSN 0730-0301, Proceedings of ACM SIGGRAPH, 2002.

Laurentini, "The visual hull concept for silhouette-based image understanding," PAMI 16, 2, pp. 150-162, 1994.

* cited by examiner

SYSTEM AND METHOD FOR INTERACTIVELY RENDERING OBJECTS WITH SURFACE LIGHT FIELDS AND VIEW-DEPENDENT OPACITY

FIELD OF THE INVENTION

This invention relates generally to rendering three-dimensional objects, and more particularly to rendering arbitrary views of objects from a limited set of photographs acquired of the objects.

BACKGROUND OF THE INVENTION

Often, it desired to interactively render 3D objects that have complex reflectance properties and elaborate surface details. Good examples are trees, grass, furry Teddy bears, feathers, and filled wineglasses. Because of their intricate shapes, and complex lighting properties, it is practically impossible to render such objects from parametric or geometric models such as polygon meshes. Therefore, models for these types of objects are usually constructed and rendered from high-resolution images acquired of the objects. This technique is generally known as image-based rendering.

Early image-based rendering methods required a very large set of images to achieve high rendering quality, see McMillan et al., "Plenoptic modeling: An image-based rendering system," Computer Graphics, SIGGRAPH 95 Proceedings, pp. 39–46, 1995, Chen et al., "View interpolation for image synthesis," Computer Graphics, SIGGRAPH 93 Proceedings, pp. 279–288, 1993, Levoy et al., "Light field rendering," Computer Graphics, SIGGRAPH 96 Proceedings, pp. 31–42, 1996, and Gortler et al., "The lumigraph," Computer Graphics, SIGGRAPH 96 Proceedings, pp. 43–54, 1996.

A more scaleable approach is to parameterize the object's images directly onto a surface of the model as textures. That approach, commonly referred to as surface light fields, enables more accurate interpolation between the images and has been employed by view-dependent texture mapping (VDTM), see Debevec et al., "Modeling and rendering architecture from photographs: A hybrid geometry- and image-based approach," Computer Graphics, SIGGRAPH 96 Proceedings, pp. 11–20, 1996, Pulli et al., "View-based rendering: Visualizing real objects from scanned range and color data," Eurographics Rendering Workshop 1997, pp. 23–34, 1997, and Debevec et al., "Efficient view-dependent image-based rendering with projective texture-mapping," Proceedings of the 9$^{th}$ Eurographics Workshop on Rendering, pp. 105–116, 1998; surface light field rendering, see Miller et al., "Lazy decompression of surface light fields for precomputed global illumination," Proceedings of the 9$^{th}$ Eurographics Workshop on Rendering, PP. 281–292, 1998, Wood et al., "Surface light fields for 3d photography," Computer Graphics, SIGGRAPH 2000 Proceedings, PP. 287–296, 2000, and Nishino et al., "Eigen-texture method: Appearance compression based on 3D model," Proc. of Computer Vision and Pattern Recognition, pp. 618–624, 1999; unstructured lumigraph rendering (ULR), see Buehler et al., "Unstructured lumigraph rendering," Computer Graphics, SIGGRAPH 2001 Proceedings, pp. 425–432, 2001; and light field mapping (LFM), see Chen et al., "Light Field Mapping: Efficient Representation and Hardware Rendering of Surface Light Fields," ACM Transactions on Graphics 21, Proceedings of ACM SIGGRAPH 2002, ISSN 0730-0301, pp. 447–456. 2002.

Surface light field approaches are limited by the complexity of the object's geometry. A dense mesh requires many vertices and leads to a decrease in rendering performance. Faster rendering with a coarse mesh leads to artifacts that are most noticeable at the silhouette of the object.

Silhouette clipping can improve the appearance of images rendered from coarse polygonal models. However, clipping is impractical for complex silhouette geometry such as trees, feathers, and furry textures. Concentric, semitransparent textured shells have been used to render hair and furry objects. However, to improve the appearance of object silhouettes, extra geometry called textured fins is used on all edges of the object. Neither of these methods uses view-dependent texture and opacity information from the acquired images.

Accurately silhouettes of high complexity but simple geometry can be rendered with opacity hulls and point models, see Matusik at al., "Image-based 3D photography using opacity hulls," ACM Transaction on Graphics 21, 3 pp. 427–437, ISSN 0730-0301, Proceedings of ACM SIGGRAPH, 2002. Opacity hulls can use view-dependent transparancy values (alphas) for every surface point on the visual hull, see Laurentini, "The visual hull concept for silhouette-based image understanding," PAMI 16, 2, pp. 150–162, 1994, or any other geometry that is bigger or equal to the geometry of the real object. Matusik et al. used opacity hulls with surface light fields, so called opacity light fields, for objects under a fixed illumination, and surface reflectance fields for objects under varying illumination.

Opacity light fields are effective for rendering objects with arbitrarily complex shape and materials from arbitrary view points. However, point models for opacity light fields are impracticably large, requiring on the order of 2–4 Gigabytes of memory, and it is difficult to accelerate point-based rendering method with graphics hardware. Consequently, it can take up to thirty seconds to render a frame, clearly not interactive. Therefore, polygon rendering methods that can be accelerated are preferred.

Therefore, it is desired to provide a system a method that can render models of complex textured objects from arbitrary views from a limited set of fixed images. Furthermore, it is desired that the method operates interactively, and uses a small amount of memory.

SUMMARY OF THE INVENTION

The invention provides a hardware-accelerated system and method for rendering surface light fields with an opacity hull. The method enables interactive visualization of objects that have complex reflectance properties, and elaborate geometrical, texture, and color details. The opacity hull is a three dimensional shape enclosing the object with view-dependent opacity values parameterized onto that shape.

A combination of the opacity hull and surface light fields yields opacity light fields according to the invention. Opacity light fields are ideally suited for rendering models acquired from 3D photography of visually complex objects and scenes.

The invention implements the opacity light fields in two embodiments of surface light field rendering methods: view dependent texture mapping (VDTM) and unstructured lumigraph rendering (ULR).

The method according to the invention is accelerated by conventional graphics hardware. All three embodiments achieve interactive or real-time frame rates.

More particularly, a method renders a model of a 3D object. A polygon model of the 3D object is generated, and a set of input images is acquired of the object.

For each vertex of the polygon model, a set of visible views is located, and a set of closest views is selected from the visibility views. Blending weights are determined for each closest view.

Then, the each polygon in the model is rendered into an output image. The rendering is performed by blending images of the set of input images corresponding to the set of closest views of each vertex of the polygon using the blending weights.

DETAILED DESCRIPTION OF THE PREFERRED EMBODIMENT

System and Method Overview

Figure 1:
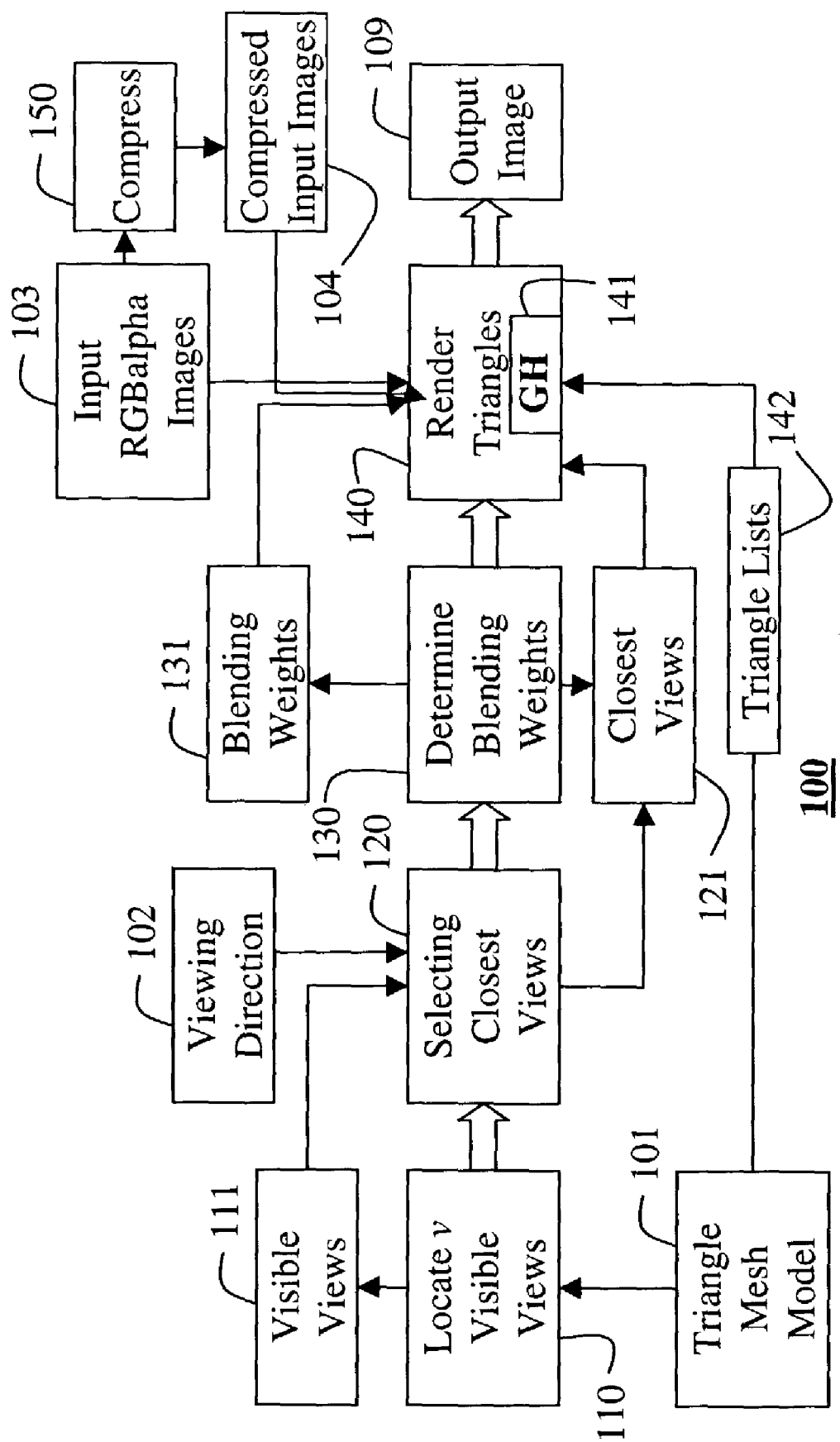
FIG. 1 is a block diagram of an image-based rendering system and method according to the invention.

FIG. 1 shows a system and method 100 according to the invention. The system and method 100 interactively render surface light fields with view-dependent opacity light fields. The rendering can generate an output image 109 from a model of a complex textured object for arbitrary viewing directions.

The input to the system 100 includes a triangular mesh 101, a viewing direction 102, and an input set of rectified RGBα images 103. The mesh 101 defines a surface shape or model of the object. Any known method for generating a polygon mesh model for an object can be used. The direction d 102 indicates a point of view for the output image 109, The input images 103 are acquired of the object by cameras at a fixed number of camera locations. The images can be digitized color photographs, or images acquired with a digital camera.

The method 100 includes the following steps. For each vertex v in the mesh 101, locate 110 a set of visible views 111. A vertex v is considered visible when all triangles containing the vertex are completely visible.

Then for each mesh vertex v, select 120 a set of k closest views 121 visible from the given viewing direction d 102 from the set of visible views 111. In the preferred embodiment, $k \leq 3$, as described in greater detail below.

For each closest view 121, determine 130 blending weights 131. Higher weights are assigned to views that have a closer angular alignment with the direction d 102, and lower weights are assigned for those views having a farther alignment.

Render 140 each triangle in the mesh 101 by blending the images 103 from the closest views 121 of its three vertices $v_0$, $v_1$, and $v_2$.

As described below, the input images 103 can be compressed 150 into compressed images input 104 to reduce memory storage.

Our system and method can be adapted for two embodiments, view-dependent texture mapping (VDTM) and unstructured lumigraph rendering (ULR). These embodiments differ in implementation of each of the steps, but share a number of common techniques.

View-Dependent Texture Mapping (VDTM)

Our view-dependent texture mapping for image-based rendering achieves photo-realism by blending pictures 103 of the object as projective textures on the 3D triangle model 101.

In the prior art, view-dependent texture mapping has been done at the polygon level by constructing a view map for each polygon in the mesh. The view map was a planar triangulation whose vertices correspond to view points of the input images. To construct the view map, one had to first project unit vectors towards visible views onto a plane of the polygon, and then resample the projected vectors to fit a predefined regular triangulation.

Specifically, each vertex of the triangulation corresponded to a closest projected original view. View maps were queried for a triangle that contained the projection of a new desired view. Original pictures corresponding that triangle were blended with weights equal to barycentric coordinates of the projected view within that triangle.

While that approach assured smooth transitions between views, it also introduced resampling errors. Furthermore, because blending was done on a per polygon basis, continuity of appearance across triangle edges was not preserved.

Blending the views on a per-vertex basis could preserve continuity across the triangles. At each vertex, one could construct a Delaunay triangulation of the visible views, which can be resampled into the view map. The view map could be a dense (32×32) uniform grid of views determined by matrix factorization of the original views. That approach would render complex objects with controllable precision. However, light field approximations using matrix factorization are tedious to calculate and sensitive to accuracy of the data and the model.

Therefore, we use graphics hardware (GH) 141 to enable fast rendering from the original images 103, keeping their sharpness and detail.

We render the input RGBα images 103 by using barycentric weights 131 within a triangulation using local coordinate frames for each vertex v of each polygon. However, in contrast with the prior art, we blend the weights 131 on a per-vertex basis. In addition, we do not resample the input images 103. In order to select 120 the closest views 121 and to determine 130 the corresponding blending weights 131, we "query" the original Delaunay triangulations of visible views 111 at each vertex v.

Figure 2B:
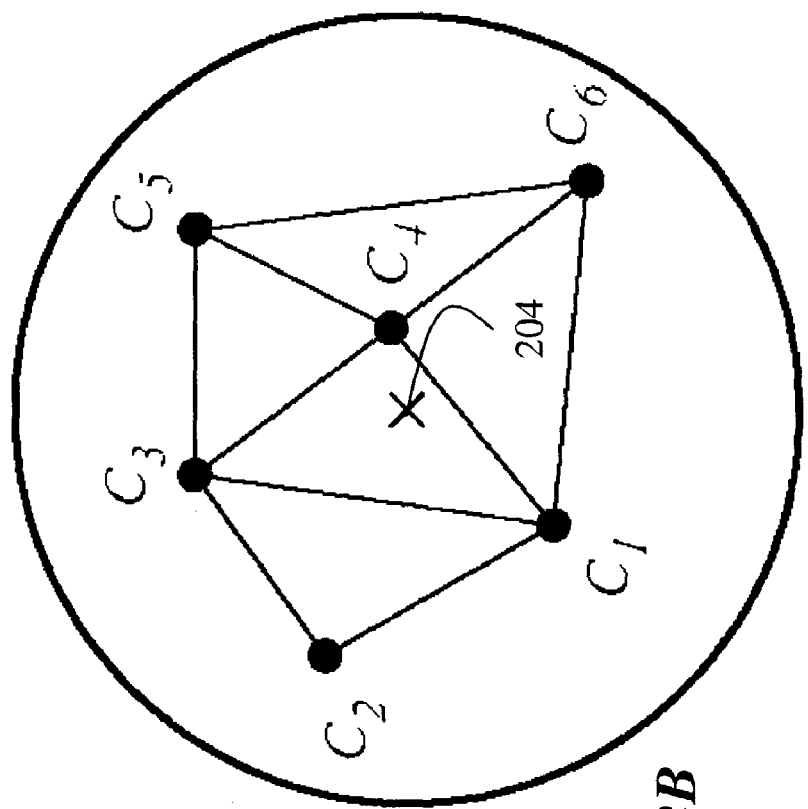
FIGS. 2A–B are diagrams of Delauney triangulation of visibility views according to the invention.
Figure 2A:
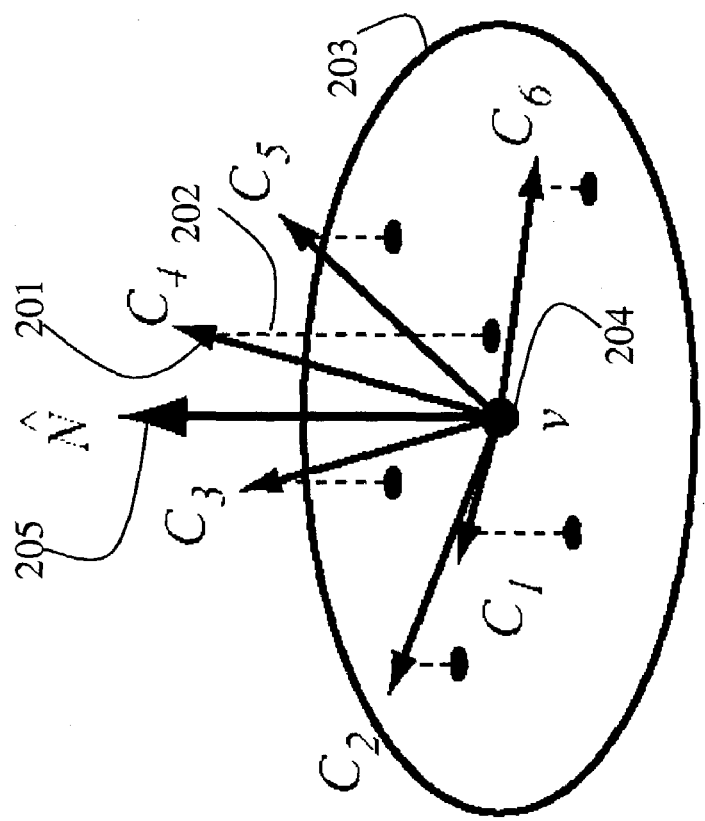

As shown in FIGS. 2A–B, normalized viewing vectors 201 of visible camera views ($C_{1-C6}$) are first projected 202 onto a tangential plane 203 having a surface normal $\hat{N}$ 205 at each vertex v. As shown in FIG. 2B, the projected vectors are subsequently triangulated with a 2D Delaunay triangulation process. The closest views 121 for the given viewing direction d 102 are the vertices of the Delaunay triangle that project into the viewing direction d 102.

Figure 3B:
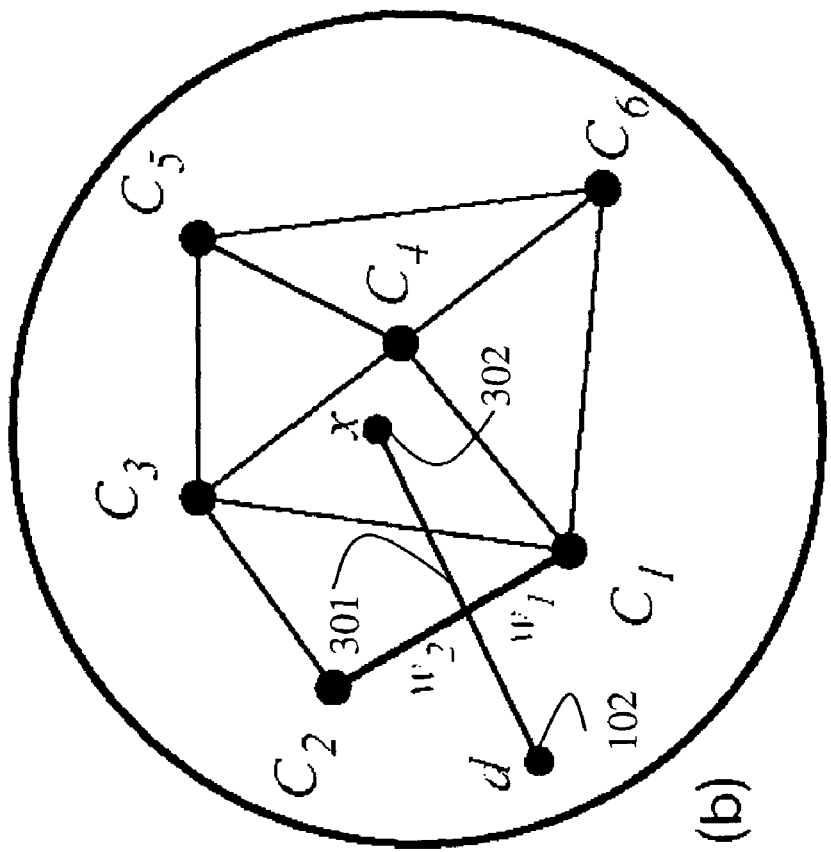
FIGS. 3A–B are diagrams of closest views and weights according to the invention.
Figure 3A:
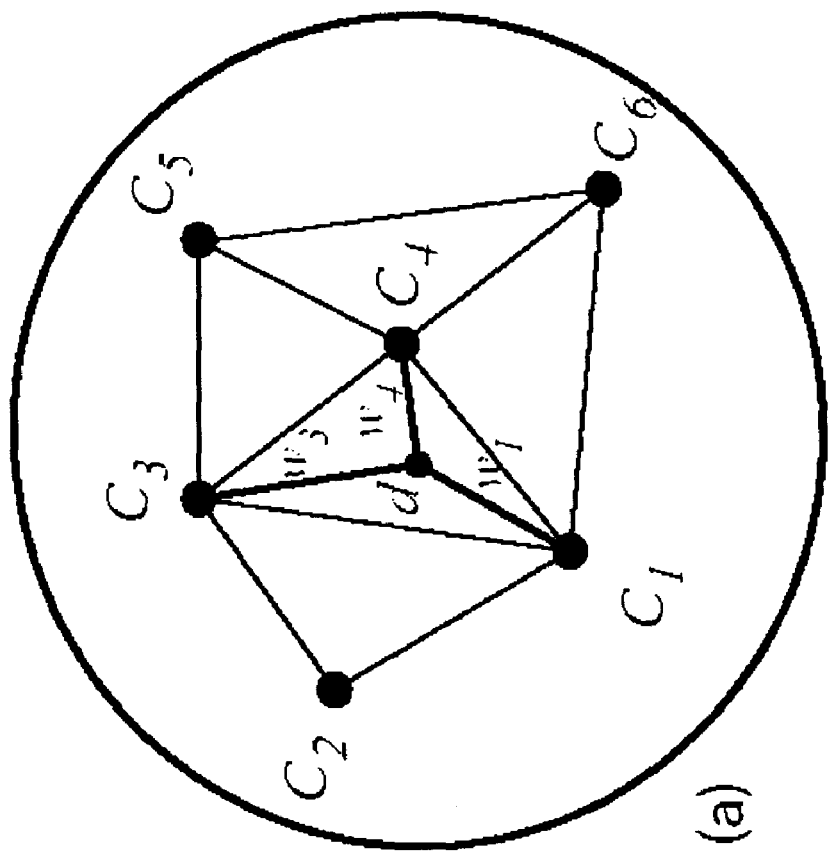

As shown in FIG. 3A, the blending weights $w_1$, $w_2$, and $w_3$ 131 are equivalent to barycentric weights of the direction d within the triangle.

However, as shown in FIG. 3B, a desired view direction d may not fall within any of the triangles. In this case, we extrapolate by blending between nearby views on the convex hull of the triangulation. These views are found by intersecting convex hull edges with a line 301 connecting d 102 and the centroid x 302 of the convex hull.

The views belonging to the intersecting edge are weighed proportional to their distances to the intersection. Specifically, weights are larger for views closer to the intersection. With this technique, we ensure continuity of the blending weights 131.

Finally, if a triangulation is impossible, i.e., there are less than three visible views, then all available views are used and weighted according to their distance to the direction d. This situation rarely occurs when the mesh is smooth and the input images are densely sampled.

When determining planar triangulations, the distances between views are distorted by the projections 202. In addition, views below the tangential plane are ignored. Spherical Delaunay triangulations can be constructed to avoid these problems and to eliminate the need for extrapolation.

After we have select the per-vertex closest views 121 and corresponding blending weights 131, we render each triangle in the mesh 101. During rendering, each triangle is textured with the set of closest views of its three vertices. This set can contain up to nine textures, but usually has less, because nearby vertices often share closest views.

Figure 4:
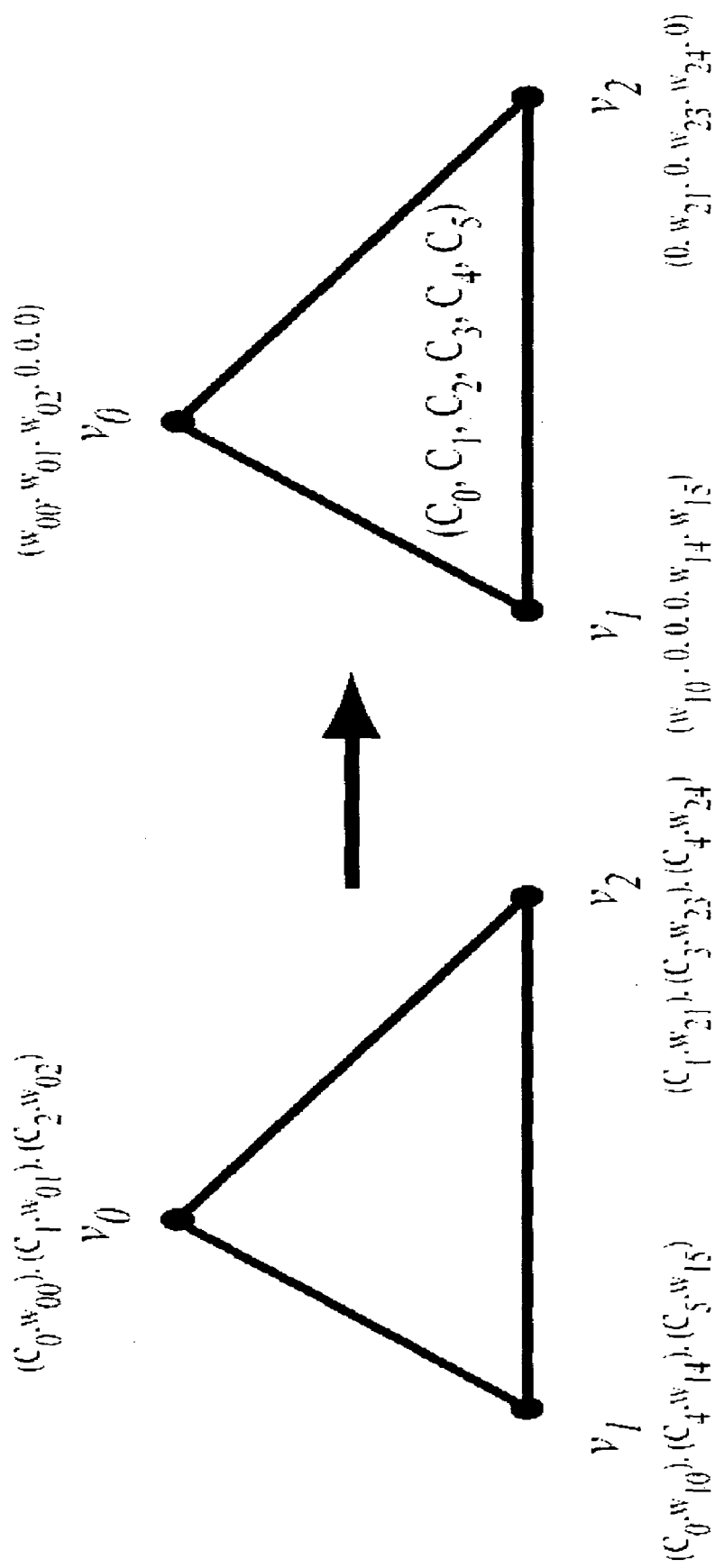
FIG. 4 is a diagram of combining vertex weights according to the invention.

FIG. 4 and Table A shows how blending weights w are combined for vertices $v_0$, $v_1$, and $v_2$. After selecting the per-vertex closest views and blending weights associated with each vertex, as shown on the left side of the Figure. We combine the weights for each triangle. The union of closest views of the three vertices defines the set of views for the triangle. The weights corresponding to the other vertices' closest views are set to zero, as show on the right side of the Figure.

We crop each image 103 to an exact bounding box of the object, and resize the resulting cropped image to approximately a quarter size. Thus, we can fit several Gigabytes of the original camera images 103 into the 128MB video graphics hardware memory.

To speed up the selecting 120 of the closest views and weights, the Delaunay triangulations are predetermined and stored along with their connectivity information. This enables fast breadth-first search of the BSP tree while rendering.

Under the assumption that a virtual camera continuously around the model, the viewing direction d 102 will mostly stay in the same Delaunay triangle or move to a neighboring one, resulting in a short search path. Rendering essentially blends camera views, which are by definition, projective textures from the view points of the corresponding cameras.

Although projective texture mapping runs efficiently in conventional graphics hardware, caching the projective texture coordinates can decrease processing time. Therefore, we predetermine per-vertex texture coordinates for all visible views, and store the textures within the mesh data. During rendering, each triangle is textured with the set of closest views of its three vertices.

For each vertex, we define up to nine textures, nine pairs of texture coordinates, and nine blending weights. Textures and coordinates are retrieved from the set of closest views and the cached coordinate data, respectively. Texture weights, on the other hand, are combined as shown in FIG. 3.

Because the same vertex can correspond to different sets of textures in different triangles, textures, coordinates, and

TABLE A

| Vertex | Closest Camera Views | Blending Weights | Triangle Closest Views | Triangle Blending Weights |
| --- | --- | --- | --- | --- |
| $V_0$ | $C_0, C_1, C_2$ | $w_{00}, w_{01}, w_{02}$ | $C_0, C_1, C_2, C_3, C_4, C_5$ | $w_{00}, w_{01}, w_{02}, 0, 0, 0$ |
| $V_1$ | $C_0, C_4, C_5$ | $w_{10}, w_{14}, w_{15}$ | | $w_{10}, 0, 0, 0, w_{14}, w_{15}$ |
| $V_2$ | $C_1, C_3, C_4$ | $w_{21}, w_{23}, w_{24}$ | | $0, w_{21}, 0, w_{23}, w_{25}, 0$ |

Transparency information in our data imposes an ordering constraint for rendering opacity light fields with conventional graphics hardware. To ensure correct alpha blending, triangles are rendered in back-to-front order. We use a binary space partitioned (BSP) tree of the mesh during preprocessing, see Fuchs et al., "On Visible Surface Generation by a Priori Tree Structures," Computer Graphics, Proceedings of SIGGRAPH 1980, Vol. 14, pp., 124–133, 1980.

We perform visibility, closest views, and weight computation on the BSP tree triangles, and traverse the tree while rendering. The actual rendering amounts to blending up to nine textures per triangle. This is carried out completely by the graphics hardware 141.

Optimizations

A naïve implementation of our method would not achieve real-time performance. We achieve much higher frame rates by compressing 150 textures, reducing per-frame CPU computation through caching and efficient data structures, as well as by exploiting modem graphics hardware capabilities.

Opacity light fields according to the invention inherently encompass large datasets, on the order of several Gigabytes, mostly comprised of textures. To maximize hardware rendering performance, it is imperative to fit all textures in a video memory of the graphics hardware 141. We do this by the compression 150.

weights are presented to graphics hardware as triangle lists 142. The triangle list forms the input stream to the graphics hardware 141. Then, the rendering 140 can proceed using programmable vertex and pixel shaders of the graphics hardware 141.

As stated above, opacity information enforces back-to-front ordering of rendered triangles as reflected in the BSP tree. Although the tree can be predetermined, additional vertices are generated by splitting triangles during BSP tree construction. These additional triangles significantly decrease the rendering performance.

To alleviate this problem, multiple BSP trees of the same mesh are constructed by random insertion of triangles, and only the smallest tree is retained. Alternatively, as described below, a depth peeling process could be used for depth sorting of the triangle primitives, and the blending weights could then only be performed once, making the method faster. However, conventional graphics hardware is not capable of blending nine textures and computing depth layers without significant degradation in performance. Consequently, we use BSP trees for the VDTM and ULR embodiments.

Opacity light fields according to the invention affects the rendering performance in another way. Each triangle must be rendered in a single pass. If there were more than one pass per triangle, then the alpha blending is incorrect.

Unstructured Lumigraph Rendering (ULR)

Unstructured lumigraph rendering can be used in place of VDTM as an alternative blending process for opacity light fields according to the invention. We base our ULR rendering of opacity light fields on Buehler et al., "Unstructured lumigraph rendering," Computer Graphics, Proceedings SIGGRAPH 2001, pp. 425–432, 2001.

Our rendering differs from the previously described VDTM by selecting only the closest views and their corresponding blending weights. Instead of computing Delaunay triangulations, our ULR uses a ranking function based on the angles between the original views used to acquire the input images 103, and the desired view of the output image 109 from direction d 102.

Figure 5:
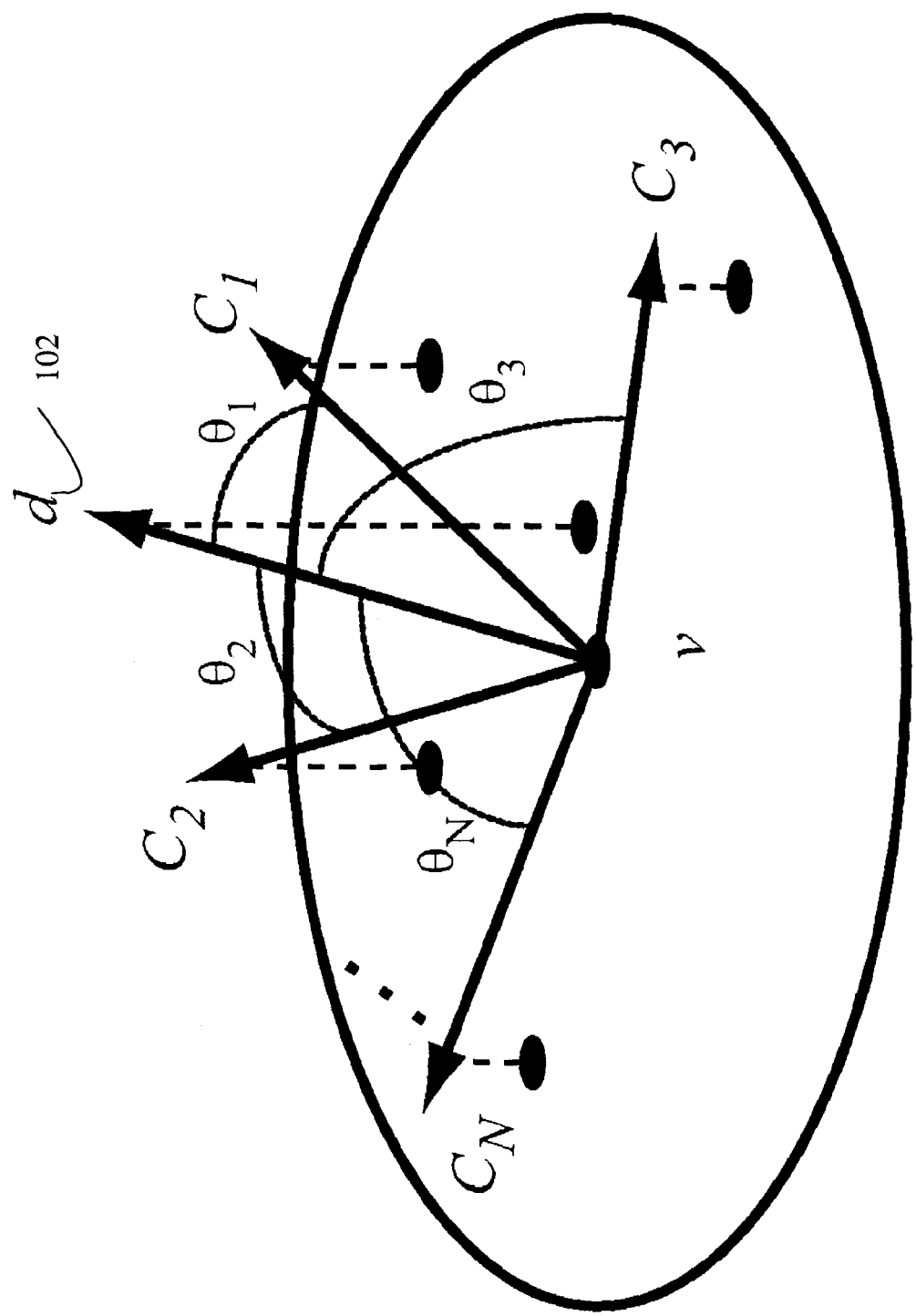
FIG. 5 is a diagram of unstructured lumigraph rendering according to the invention.

As shown in FIG. 5, for each vertex v and the viewing direction d 102, the process finds the k nearest visible views C by comparing the angles θ they subtend with the direction d 102.

Blending weights are determined according to:

$$r_i = \frac{1 - \frac{p_i}{t}}{p_i} = \frac{1 - \frac{p_i}{p_k}}{p_i}, \quad w_i = \frac{r_i}{\sum_{j=1}^{k-1} r_j} \quad (1)$$

$$0 < i < k, \quad \theta_i \le \theta_j, \quad \forall\, i < j$$

Here, $r_i$ represent the relative weights of the closest k-1 views. These weights are normalized to sum up to one, resulting in actual weights $w_i$.

A penalty term $p_i$ enforces epipole consistency. The penalty term quantifies the angular difference between $C_i$ and the direction d. The penalty decreases as the angular difference decreases. The penalty $p_k$ of the $k^{th}$ closest view, which is not used for blending, defines an adaptive threshold t.

This technique enforces smooth transitions from view to view. As a view exits the closest view set, its weight decreases to zero.

Our ULR approach is advantageous due to its simplicity and flexibility. Unlike VDTM, the weight determination 130 does not depend on the mesh 101, making the ULR embodiment more general, and it can execute interactively.

The penalty function as described Buehler et al. can be resolution sensitive. However, in our implementation, we ignore resolution penalties because our original views have the same resolution and similar distance to the object.

For the penalty term we use $$p_i = 1 - \cos\theta_i \quad (2)$$

Then, the relative weights then follow directly from Equation 1:

$$r_i = \frac{1 - \frac{1 - \cos\theta_i}{1 - \cos\theta_k}}{1 - \cos\theta_i} = \frac{\cos\theta_i - \cos\theta_k}{(1 - \cos\theta_i)(1 - \cos\theta_k)} \quad (3)$$

$$0 < i < k, \quad \cos\theta_i \ge \cos\theta_j, \quad \forall\, i < j$$

Because of normalization, we drop the constant (1−cos $\theta_k$) from the denominator of the expression, resulting in:

$$r_i = \frac{\cos\theta_i - \cos\theta_k}{1 - \cos\theta_i} \quad (4)$$

The ULR process begins by computing cosines dot products of the angles between the desired view and each original visible view at each vertex v. It selects the k=4 closest views, and blends three of them using Equations 1 and 4. If only three views are available, then the same equations can be used with k=3. For vertices with less than three visible views, we use all available views and the same equations with a threshold of one, so cos $\theta_k$ is set to zero.

For the ULR embodiment, cosines are determined for each image. Although Delaunay triangulations are no longer needed as in the VDTM embodiment, visibility information is still useful. Therefore, per-vertex visible views are determined and stored during a preprocessing step. However, the visibility information does not need to be used for objects with relatively small occlusions. All camera images can be considered for blending at each vertex. This results in a high quality rendering. Other aspects of this embodiment, i.e., BSP tree construction and traversal, resizing textures, caching texture coordinates, combining weights, hardware shaders, and rendering, are the same as for the VDTM embodiment described above.

EFFECT OF THE INVENTION

The invention provides a system and method for implementing opacity light fields in the framework of two surface light field rendering methods: VDTM and ULR. The method can be implemented with fully accelerated graphics hardware. Our invention effects an interesting set of solutions for high quality and high performance rendering. VDTM and ULR provide very high image quality at interactive speeds.

Both embodiments compare favorably to point rendering methods that use many more vertices, e.g., 0.5 to 1.5 million, see Matusik et al., "Image-based 3D photography using opacity hulls," ACM Transaction on Graphics 21, Proceedings of ACM SIGGRAPH, pp. 427–437, 2002). We use only thousands of relatively coarse triangle meshes. In addition, the VDTM and ULR embodiments are two orders of magnitude faster.

Opacity light fields offer a trade-off between the amount of detailed geometry and the amount of view-dependent opacity. A very dense mesh that fits the object perfectly does not require any opacity information. However, storing and rendering very large meshes is inefficient, and detailed geometry of real-life objects is very hard to obtain. Coarse polygon meshes, in combination with accurate opacity information, is a very good solution in this tradeoff. See Appendix A for pseudo-code for the opacity light field mapping method.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

Appendix A

A.1 Modified VDTM Rendering

```
VDTM(desired view direction d)
  if d ≠ old_view then
    ComputeWeights(d)
    old_view = d
    for each mesh triangle t do
      combine closest views and weights from t's vertices
    end for
  end if
  for each mesh triangle t in back-to-front order do
    set the textures
    set texture coordinates and weights as shader streams
    render t using programmable graphics hardware
  end for
ComputeWeights(d)
  for each mesh vertex v do
    project d onto the Delaunay triangulation of v
    render t using programmable graphics hardware
  end for
```

A.2 Modified ULR Rendering

```
ULR(desired view direction d)
  this method is identical to the VDTM method
ComputeWeights(d)
  for each mesh vertex v do
    compute d dot C_i, i.e., cos θ_i, for every visible view C_i
    pick views with largest cos θ_i, as closest views
    compute their blending weights according to equations 1 and 4
  end for
```

We claim:

1. A method for rendering a model of a 3D object, comprising:
   generating a polygon model of the 3D object, each polygon having a plurality of vertices;
   acquiring a set of digitized RGB α input images of the object;
   locating, for each vertex of the polygon model, a set of visible views;
   selecting from the set of visible views, for each vertex of the polygon model, a set of closest views for a viewing direction;
   projecting normalized viewing vectors of the visible views onto a tangential plane having a surface normal at each vertex;
   triangulating the projected vectors 2D Delaunay triangulation so that the closest views for the viewing direction are particular vertices of a Delaunay triangle that project into the viewing direction;
   determining blending weights for each closest view;
   rendering each polygon in the model into an output image, the rendering performed by blending images of the set of input images corresponding to the set of closest views of each vertex of the polygon using the blending weights, and wherein the rendering uses view-dependent texture mapping.

2. The method of claim 1 wherein the model defines a surface shape of the object, the viewing direction is a point of view for the output image, the set of images are acquired by a camera at a fixed location with respect to the object, and the rendering is performed by graphics hardware.

3. The method of claim 1 wherein a particular vertex is visible when all polygons containing the vertex are completely visible from the viewing direction.

4. The method of claim 1 wherein a number k of the closest views is less than four.

5. The method of claim 1 further comprising:
   assigning higher blending weights to the closest views having a closer angular alignment with the viewing direction;
   assigning lower blending weights to the closest views having a farther angular alignment with the viewing direction.

6. The method of claim 1 further comprising:
   compressing each input images; and
   rendering by blending the compressed images.

7. The method of claim 1 wherein the rendering uses unstructured lumigraph rendering.

8. The method of claim 1 wherein the blending weights are equivalent to barycentric weights of the viewing direction within the Delaunay triangle.

9. The method of claim 1 wherein the Delaunay triangulation is spherical.

10. The method of claim 1 further comprising:
    rendering each polygon in a back-to-front order using a binary space partitioned tree of the polygon model.

11. The method of claim 6 further comprising:
    cropping each input image to an exact bounding box of the object; and
    resizing the cropped image to approximately one quarter size.

12. The method of claim 1 wherein the Delaunay triangulation is predetermined.

13. The method of claim 1 further comprising:
    defining, for each vertex, up to nine textures, up to nine pairs of texture coordinates, and up to nine blending weights.

14. The method of claim 13 wherein the rendering is performed by graphics hardware, and the textures, texture coordinates and blending weights are presented to the graphics hardware as triangle lists.

15. The method of claim 7 wherein the selecting is performed by a ranking function based on angles between views of the input images and the viewing direction.

16. The method of claim 7 wherein the blending weights are determined according to:

$$r_i = \frac{1 - \frac{p_i}{t}}{p_i} = \frac{1 - \frac{p_i}{p_k}}{p_i}, \quad w_i = \frac{r_i}{\sum_{j=1}^{k-1} r_j}$$

$$0 < i < k, \quad \theta_i \leq \theta_j, \quad \forall\, i < j$$

where $r_i$ represent a relative weights of the closest $k-1$ views, and the blending weights are normalized to sum up to one, and penalty term $p_i = 1 - \cos\theta_i$ enforces epipole consistency.

17. The method of claim 7 wherein the visible views for each vertex are predetermined.

18. A system for rendering a model of a 3D object, comprising:
    means for generating a polygon model of the 3D object, each polygon having a plurality of vertices;
    a camera, at a fixed location, configured to acquire a set of input images of the object;
    means for locating, for each vertex of the polygon model, a set of visible views;

means for selecting from the set of visible views, for each vertex of the polygon model, a set of closest views for a viewing direction;

means for projecting normalized viewing vectors of the visible views onto a tangential plane having a surface normal at each vertex;

means for triangulating the projected vectors 2D Delaunay triangulation so that the closest views for the viewing direction are particular vertices of a Delaunay triangle that project into the viewing direction;

means for determine blending weights for each closest view; graphics hardware configured to render each polygon in the model as an output image, the rendering performed by blending images of the set of images corresponding to the set of closest views of each vertex of the polygon using the blending weights, and wherein the rendering uses view-dependent texture mapping.

* * * * *